May 9, 1950     J. P. DONOHUE     2,507,335
DUST ARRESTER

Filed Oct. 2, 1946     5 Sheets-Sheet 1

INVENTOR.
JAMES PAUL DONOHUE
BY
George F. Gill
ATTORNEY.

May 9, 1950  J. P. DONOHUE  2,507,335
DUST ARRESTER
Filed Oct. 2, 1946  5 Sheets-Sheet 3

INVENTOR.
JAMES PAUL DONOHUE
BY George F. Gill
ATTORNEY.

May 9, 1950     J. P. DONOHUE     2,507,335
DUST ARRESTER

Filed Oct. 2, 1946     5 Sheets-Sheet 4

INVENTOR.
JAMES PAUL DONOHUE
BY
*George F. Gill*
ATTORNEY.

May 9, 1950     J. P. DONOHUE     2,507,335
DUST ARRESTER

Filed Oct. 2, 1946     5 Sheets-Sheet 5

*INVENTOR.*
JAMES PAUL DONOHUE
BY
*George T. Gill*
ATTORNEY.

Patented May 9, 1950

2,507,335

UNITED STATES PATENT OFFICE 2,507,335

DUST ARRESTER

James Paul Donohue, Westfield, N. J.

Application October 2, 1946, Serial No. 700,739

13 Claims. (Cl. 183—61)

The invention herein disclosed relates to a dust arrester for removing dust carried by air. More particularly, the invention relates to a dust arrester of the kind in which cloth dust-arresting screens are utilized to remove dust carried by the air, such for example as the dust created by operations performed in certain industrial establishments.

An object of the invention is to provide a dust arrester of the kind mentioned in which the dust-arresting screens are continuously and automatically cleaned by effecting a reverse flow of air through the screens. Another object of the invention is to provide a dust arrester of this kind having a simple and effective arrangement and construction of dust-arresting screens. A further object of the invention is to provide a dust arrester of this kind that is comparatively simple in construction, effective and reliable in operation and comparatively inexpensive to manufacture.

The foregoing objects and certain advantages that will hereinafter appear are realized in the embodiment of the invention disclosed in the accompanying drawings and described in detail below, from which description a clearer understanding of the invention may be had.

Figure 1:
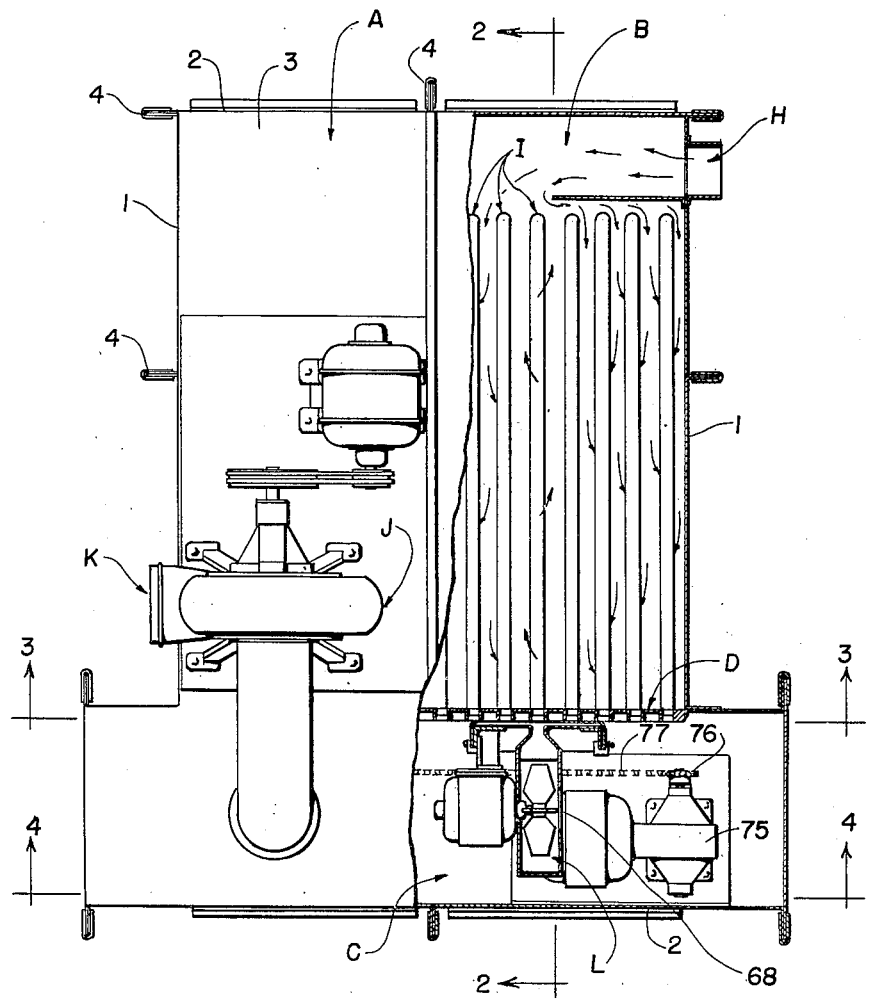
Figure 2:
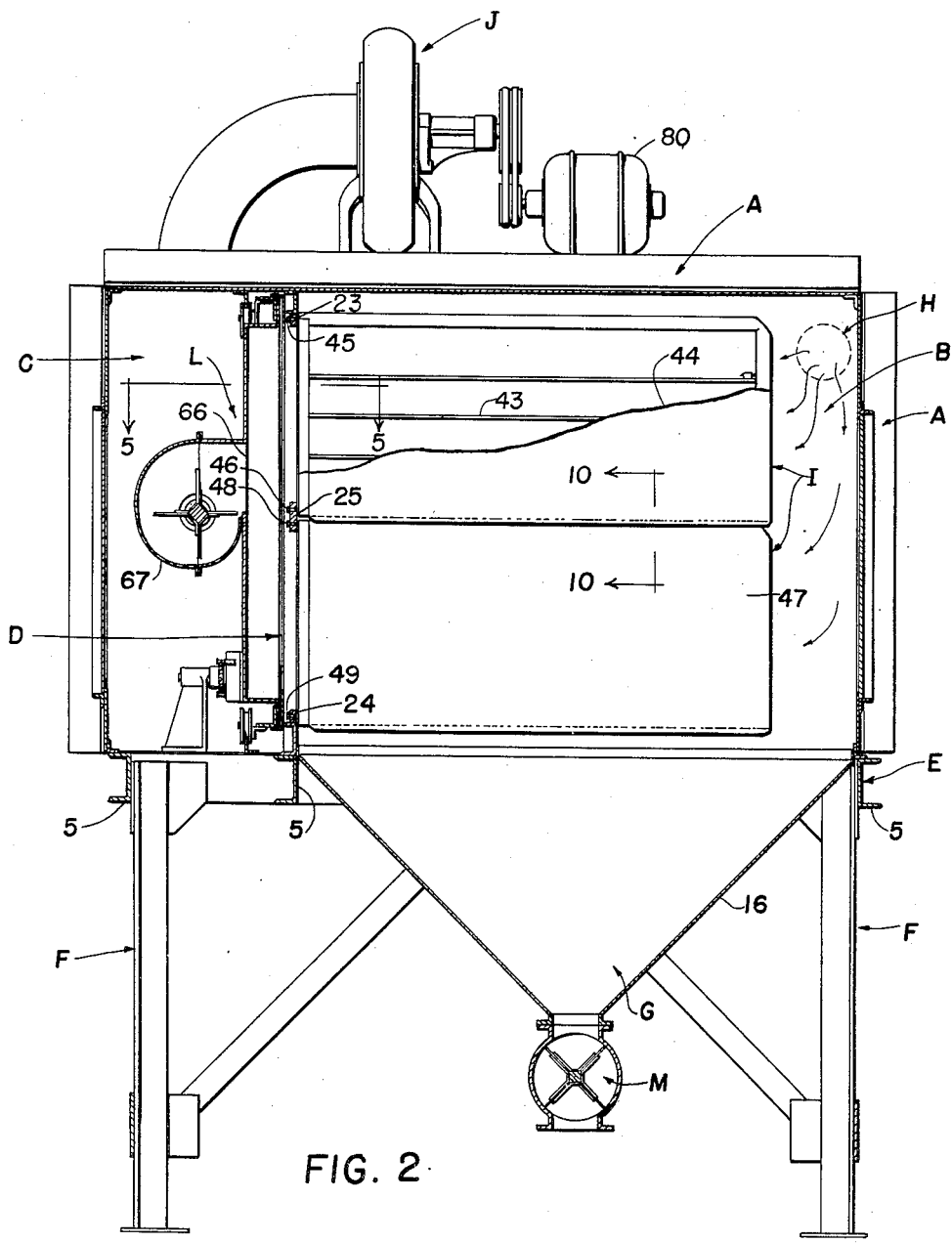
Figure 3:
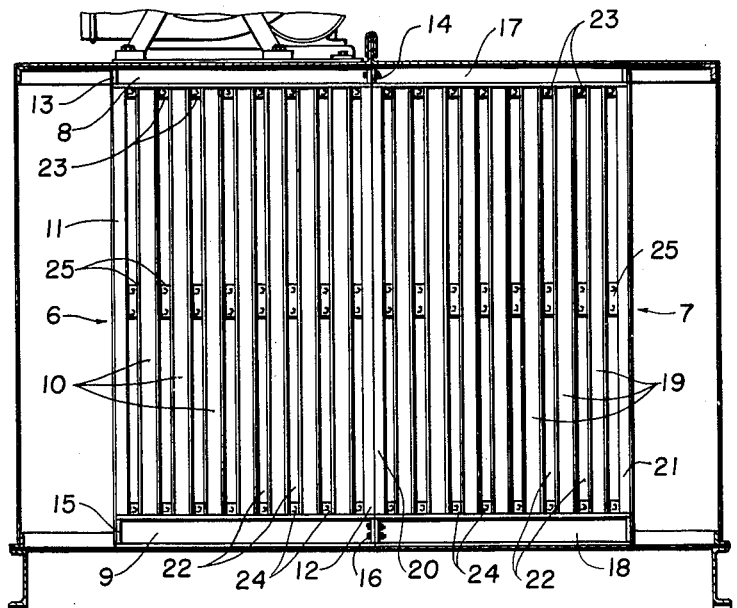
Figure 4:
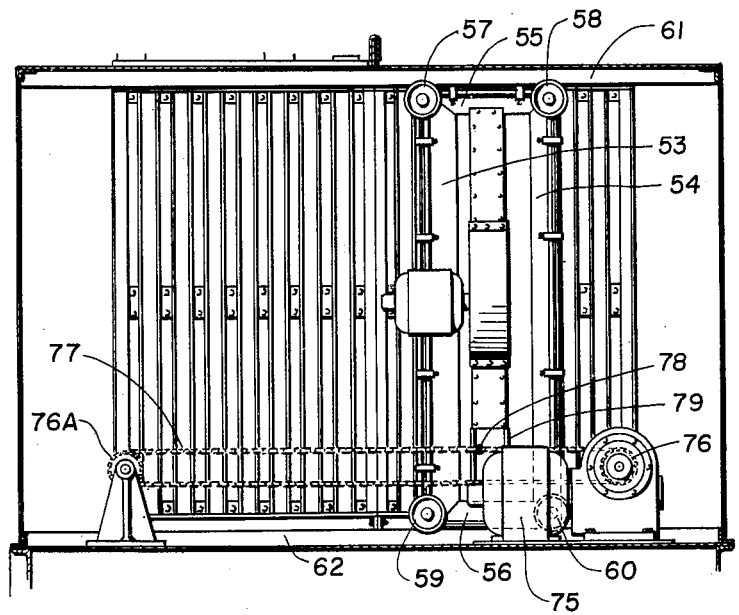
Figure 5:
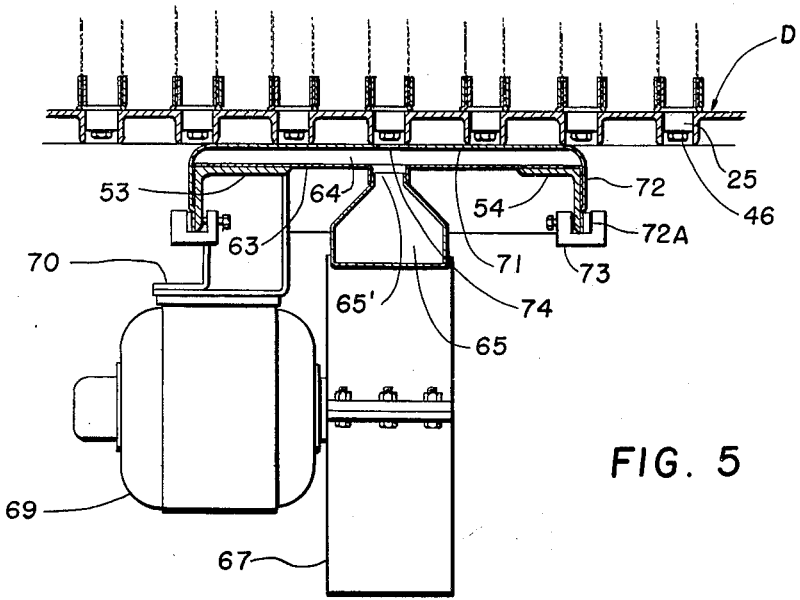
Figure 6:
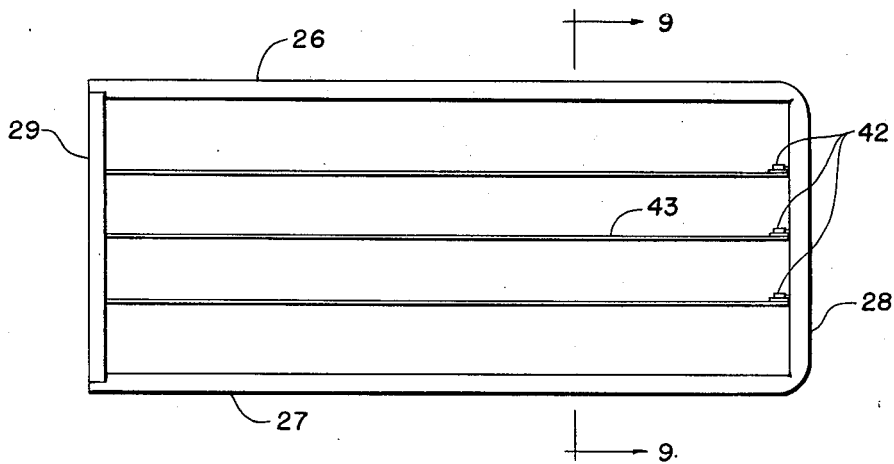
Figure 7:
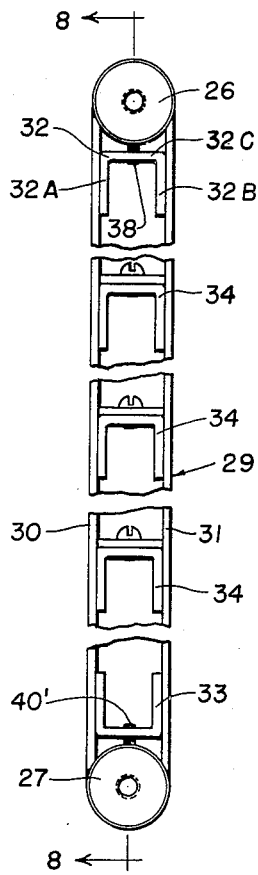
Figure 8:
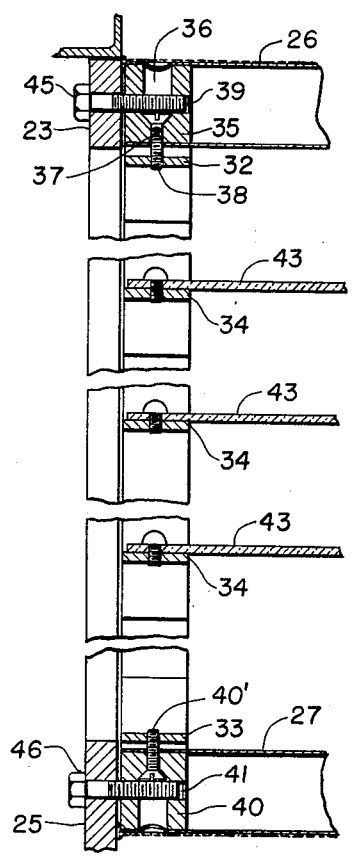
Figure 9:

The drawings include:

Fig. 1 which is a plan, partly in section, of a dust arrester embodying the invention;

Fig. 2 which is a sectional elevation of the same taken on the line 2—2 of Fig. 1;

Fig. 3 which is a vertical, sectional elevation illustrating the dust wall and taken in the line 3—3 of Fig. 1;

Fig. 4 which is a vertical, sectional elevation taken on the line 4—4 of Fig. 1;

Fig. 5 which is a fragmentary, sectional plan taken on the line 5—5 of Fig. 2;

Fig. 6 which is a side elevation of a dust-arresting frame;

Fig. 7 which is an end elevation of the same;

Fig. 8 which is an enlarged, fragmentary, sectional elevation taken on the line 8—8 of Fig. 7;

Fig. 9 which is a sectional elevation taken on the line 9—9 of Fig. 6; and

Figure 10:
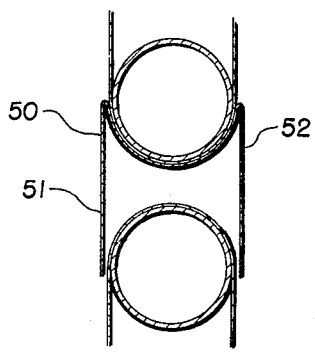

Fig. 10 which is an enlarged, transverse, fragmentary section taken on the line 10—10 of Fig. 2.

The dust arrester illustrated in the drawings comprises, in general, a housing, designated generally by the character A, in which there is a dust-collecting chamber B and a clean air chamber C. These chambers are separated by a vertical dust wall D. The housing A is mounted upon a frame E supported on uprights F. From the bottom of the dust-collecting chamber, a hopper G extends downwardly and it is open at its upper end to receive the dust from the dust-collecting chamber. An air inlet opening H is provided in one side wall of the dust-collecting chamber, adjacent the top of the chamber. A series of vertical dust-collecting screens I are mounted in the dust-collecting chamber, the interior of which screens communicate with openings through the dust wall.

Air is drawn from the clean air chamber by a fan J. In this way, dust laden air is drawn into the dust-collecting chamber, through the dust-arresting screens, into the clean air chamber, and delivered, free of dust, at the outlet K of the fan J. Within the clean air chamber there is a movably mounted screen cleaning arrangement L which moves back and forth across the openings to the screens and effects a reverse flow of air through the screens to remove the dust collected on the screens.

The dust thus removed from the screens drops into the hopper G from which it may be removed by actuating a rotating valve M at the bottom of the hopper.

The housing A is desirably constructed of sheet metal side walls 1, end walls 2 and top 3, all suitably reenforced where desirable with angle irons or ribs 4. It is mounted as a unit on a horizontal frame made up of channel frame elements 5 supported by the standards F.

The dust wall D (Figs. 1, 3 and 5) extends transversely of the housing to separate the housing and form the dust-collecting chamber and clean air chambers, B and C. Desirably, the dust wall is sectional so that the wall may be built up in sections to accommodate units of various capacities. Thus, as seen in Fig. 3, the dust wall consists of two sections 6 and 7. The section 6 consists of upper and lower horizontal channel members 8 and 9, respectively, with a series of spaced, vertical channel members 10 extending therebetween and welded thereto. At each end of the section, there are vertical, channel members 11 and 12 which are one half the width of the channel members 10. Also at the ends of the horizontal member 8 there are flanges 13 and 14 at right angles to the web, and at the ends of the member 9, there are similar flanges 15 and 16.

The section 7 is similar, in all respects to the section 6 having like upper and lower horizontal channel members 17 and 18 respectively, spaced vertical channel members 19, and end vertical channels 20 and 21. In assembling a dust wall of two or more sections, the adjacent end flanges of the horizontal members, and the adjacent side flanges of the vertical end channels are bolted together.

The spaces 22 between adjacent vertical channel members, such as the channel members 10 and 19, constitute vertical openings through the dust wall. At the upper end thereof, screen supporting plates 23 are welded between the channels and to the horizontal member. Like screen supporting plates 24 are welded to the bottom horizontal member, and the adjacent flanges of successive vertical members. Depending upon the height of the dust wall, intermediate screen supporting plates 25 are inserted between the vertical channels and welded thereto. The dust wall illustrated is designed to take two rows of screen sections. For this reason, only one row of intermediate screen supporting plates 25 is provided. However, the wall may be higher for greater capacity and in such event, several rows of intermediate screen supporting plates are provided to take several rows of screens.

A screen consists (Figs. 1, 6, 7, 8 and 9) of a frame covered with a cloth screen. The frame is rectangular and desirably consists of a tubular element, bent to form parallel legs 26 and 27 and an end portion 28, and an end structure 29 uniting the end portions of the tubular element. The end structure comprises spaced elements 30 and 31, spaced apart, center to center, a distance slightly less than the diameter of the tubular element. However the outside surfaces of the elements are tangential to the outer surface of the tubular element. Adjacent one end of the end structure, there is a channel or U-shaped bracket 32, the flanges 32a and 32b of which are welded to the elements 30 and 31 and the web 32c of which has a tapered opening therethrough. A like bracket 33 is in like manner, secured to the elements 30 and 31 adjacent the opposite ends thereof. At spaced intervals, there are similar brackets 34, three in number, between the elements 30 and 31 and welded thereto. These brackets 34 constitute spacer supports.

In the end of the leg 26 of the tubular element, there is secured, as by welding, a plug 35. The plug is bored diametrically to form an opening 36 of one diameter extending beyond the axis thereof and an opening 37 of lesser diameter, extending through the opposite side of the plug. A machine screw 38 is received in the opening, the head thereof engaging the conical shoulder at the juncture of the opening 36 and 37. The screw extends through the plug 35 and engages in the tapped opening in the web 32c of the bracket 32. The plug 35 is also bored axially and tapped to form a threaded opening 39 for the purpose of securing the frame to the dust wall. A like plug 40 is secured in the end of the leg 27 of the tubular element. A machine screw 40' secures the plug to the bracket 33, and an axial threaded opening 41 is provided for securing the screen frame to the screen supporting plates in the dust wall.

Secured to the end section 28 of the tubular element, there are spacer supports 42 aligned with the spacer supports 34 of the end structure 29. Extending between each of the spacer supports 34 and 42, there is a spacer bar 43. These spacer bars are of less width than the frame and are non-metallic, preferably an asbestos material such as "Transite". An envelope of screening cloth 44, covers the frame.

Screens such as described above are secured to the dust wall at the openings therethrough and extend perpendicular to the dust wall within the dust-collecting chamber. Through each of the screen-supporting plates 23 and 24, there is a bolt receiving opening and there are two spaced, bolt receiving openings through each intermediate screen supporting plate 25.

There are two screen sections mounted at each opening through the dust wall. A screen section is secured between spacer plates 23 and 25 by bolts 45 and 46. The bolt 45 extends through a screen supporting plate 23 and is threaded into the axial threaded opening in the plug 35, and the bolt 46 extends through the upper opening of the corresponding plate 25 and is threaded into the plug 40. A lower screen, such as the screen 47, (Fig. 2) is secured, in like manner by bolts 48 and 49, between the lower opening of the plate 25 and the opening in the corresponding plate 24. Thus, the screens are arranged vertically, in spaced, parallel relation, extending perpendicular to the dust wall. The interior of the screens communicate, through the open end structure 29 and the spaces 22 of the dust wall, with the clean air chamber C. Air drawn by the fan J is thus caused to flow through the sides of the cloth envelope to the clean air chamber. In passing through the sides of the screens, the dust in the air is arrested by, and deposited on the screen. Between upper and lower screen sections (Fig. 10) there is a cloth seal 50 which is sewn to the upper cloth screen envelope and has depending portions 51 and 52 which hang freely and span the space between the lower portion of the upper screen and the upper portion of the lower screen.

These seals avoid a cross flow of air between screen sections, and the air entering the dust-collecting chamber is caused to flow as indicated by the arrows in Figs. 1 and 2.

The screen cleaning arrangement L is mounted upon a movably mounted frame consisting of vertical angle irons 53 and 54 and horizontal angle elements 55 and 56 spanning and secured to the vertical elements at the ends thereof. The frame carriers, rotatably mounted thereon, two pair of grooved wheels, an upper pair 57, 58 and a lower pair 59 and 60. The upper pair engages an angle iron track 61 and the lower pair engages a lower, like track 62. The frame is thus movable along these tracks which are in a plane parallel to the dust wall.

Welded to the movable frame, there is a sheet metal wall 63, forming one wall of a chamber 64. Centrally of the wall 63, there is a vertical slot 65' which communicates with a vertical chamber 65. Intermediate the ends of the vertical chamber, the exhaust opening 66 of a pressure fan 67 communicates with the chamber 65. The inlet 68 of the pressure fan 67 is open to the clean air chamber. The fan 67 and a driving electric motor 69 are mounted on a bracket 70 secured to the movable frame element 53.

A flexible, rubber diaphragm 71 forms the other wall of chamber 64. The diaphragm has a circumambient flange 72 which engages the sides of the frame elements 53, 54, and 55, 56. Clamping strips 72a engage the flange 72 and spaced clamps 73 acting on the clamping strip secure the flange 72 in air tight contact with the frame. The diaphragm 71 has a central, vertical slot 74, the width of one of the spaces 22 in the dust wall and of substantially the same length. This diaphragm is (Fig. 5) of such width as to easily span three successive spaces 22, one on each side of a space aligned with the slot 74 in the diaphragm 71.

The movable frame is moved back and forth along the tracks 61 and 62 by an electric motor 75 to bring the slot 74 successively into alignment with the several spaces 22 of the dust wall, and the chamber 64 into communication with the several screens. On the shaft of the motor 75, which is mounted adjacent one end of the dust wall, there is mounted a sprocket 76. A chain 77 extends around the sprocket 76 and an idler sprocket 76a which is mounted adjacent the other end of the dust wall. The chain 77 carries a pin 78 which extends between the flanges of a channel 79, fixed with respect to the movable frame. As the chain moves, the pin engages a flange of the channel 79 and carries the movable frame to one end of the dust wall. When the pin passes around a sprocket, it engages the other flange of the channel 79 and moves the frame to the opposite end of the dust wall. Thus, the frame is continuously moved back and forth across the dust wall, bringing the slot 74 successively and individually into communication with the several screens.

When the unit is in operation, the fan J is continuously operated by an electric motor 80. The pressure fan 67 is also operated continuously by the motor 69, and the cleaning arrangement is continuously moved back and forth across the dust wall. When air is being drawn through a dust screen, from the dust-collecting chamber to the clean air chamber the screen cloth envelope is drawn in against the spacers 43 as shown in Fig. 9. When the slot 74 in the flexible diaphragm 71 becomes aligned with an opening 22 through the dust wall so as to bring the chamber 64 into communication with a dust screen, there is a reverse flow of air through the screen. The cloth screen balloons, as shown in broken lines in Fig. 9 and the dust is blown off the screen. The flexibility of the diaphragm 71 and the width thereof is such that with air pressure in the chamber 64, the diaphragm seals off the adjacent screens on both sides of the screen being cleaned. Thus, the dust removed is not drawn to the adjacent screens but falls to the hopper G. It is to be noted that the cleaning air is taken from the clean air chamber.

As the cleaning of the screens is effected only by reverse flow of air and without any mechanical vibration, glass cloth may be used for the screens. This is especially important for normal cloths cannot withstand the temperatures and certain elements found in the air in some plants. Mechanical vibration of glass cloth rapidly causes a deterioration of the glass cloth and a breaking of the fibers.

It will be obvious that various changes may be made by those skilled in the art in the details of the embodiment of the invention illustrated in the drawing and described in detail above within the principle and scope of the invention as expressed in the appended claims.

I claim:

1. A dust arrester of the kind described comprising in combination a plurality of vertically arranged, dust-arresting screens, means for effecting a downward flow of air between the screens and through the screens to deposit the dust carried thereby on the screens, a dust-receiving chamber below the screens, means for removing dust deposited on the screens including means for effecting a reverse flow of the air passed through the screens consecutively, and means for preventing the normal flow of air through adjacent screens, whereby dust removed from the screen through which the reverse flow of air is passing falls to the dust-receiving chamber.

2. A dust arrester of the kind described comprising in combination a housing having a dust-collecting chamber and a clean air chamber, a plurality of dust-collecting screens within the dust-collecting chamber, means for causing dust-laden air to flow into the dust-collecting chamber and through the screens to the clean air chamber, means for removing dust from the screens within the dust collecting chamber including means for causing air from the clean air chamber to flow through the screen.

3. A dust arrester of the kind described comprising in combination a housing having a dust-collecting chamber and a clean air chamber, a plurality of dust-collecting screens within the dust-collecting chamber, means for causing dust-laden air to flow into the dust-collecting chamber and through the screens to the clean air chamber, means for removing dust from the screens including a blower within the clean air chamber, and means for connecting the blower successively to the screens to effect a reverse flow of air from the clean air chamber through the screens.

4. A dust arrester of the kind described comprising in combination a plurality of parallelly arranged dust-arresting screens, means for causing dust-laden air to flow through the screens to deposit the dust carried thereby on the screens, and means for removing dust deposited on the screens including means for effecting a reverse flow of air through the screens individually and consecutively, and a diaphragm seal rendered effective by the reverse flow of air for preventing the normal flow of air through the screens adjacent the one from which dust is being removed.

5. A dust arrester of the kind described comprising in combination a plurality of vertical dust-arresting screens, means for causing dust-laden air to flow through the screens to deposit the dust carried thereby on the screens, and means for removing dust deposited on the screens including a movably mounted blower for effecting a reverse flow of air through the screens individually and consecutively, a flexible diaphragm movable with said blower and having a slot centrally thereof for connecting the blower to a screen, the diaphragm being of sufficient width to seal the screens adjacent to the one connected to the blower, and means for moving the blower and diaphragm to connect the blower to the several screens.

6. A dust arrester of the kind described comprising in combination a housing having a dust-collecting chamber and a clean air chamber, a plurality of dust-arresting screens within the dust-collecting chamber, each having a vertically arranged opening communicating with the clean air chamber, means for causing dust-laden air to flow into the dust-collecting chamber and through the screens to the clean air chamber, means for removing dust deposited on the screens including a horizontally movable blower within the clean air chamber, a pressure chamber communicating with said blower and movable therewith, a flexible diaphragm constituting a wall of said pressure chamber and of a width to span the openings of three screens, the diaphragm having a vertical opening therethrough the width of a screen opening, and means for moving the blower horizontally to bring the opening in the diaphragm successively into communication with the openings to the several screens.

7. A dust arrester of the kind described comprising in combination a housing having a dust-collection chamber and a clean air chamber, a plurality of dust-arresting screens within the dust-collecting chamber, each having an opening communicating with the clean air chamber, means for drawing air from the clean air chamber to cause dust-laden air to flow into the dust-collecting chamber, through the screens and into the clean air chamber, means for removing dust deposited on the screens including a continuously moving blower within the clean air chamber, a pressure chamber communicating with said blower and movable therewith, a flexible diaphragm constituting a wall of said pressure chamber and of a width to span the openings of three screens, the diaphragm having an opening therethrough the width of a screen opening, and means for moving the blower to bring the opening in the diaphragm successively into communication with the openings to the several screens.

8. A dust arrester of the kind described comprising in combination a plurality of fixed, spaced, parallelly arranged, dust-arresting screens, each screen including a rigid, rectangular frame and a dust-arresting screen about the frame, the screen being open at one end thereof, means for causing dust-laden air to flow through the several screens from the exterior to the interior thereof, whereby dust is deposited on the exterior of the screens, means for effecting a reverse flow of air through the screens individually for removing the dust therefrom, and means for moving said last mentioned means back and forth across the openings to the several screens.

9. A dust arrester of the kind described comprising in combination a plurality of fixed, spaced, parallelly arranged, dust-arresting screens, each screen including a rigid, rectangular frame and a dust-arresting screen about the frame, the screen having a vertical opening thereto, means for causing dust-laden air to flow through the several screens from the exterior to the interior thereof, whereby dust is deposited on the exterior of the screens, means for effecting a reverse flow of air through the screens individually for removing the dust therefrom, and means for moving said last mentioned means horizontally back and forth across the openings to the screens.

10. A dust arrester of the kind described comprising in combination a housing having a dust-collecting chamber and a clean air chamber, a plurality of fixed, spaced, parallelly arranged dust-collecting screens within the dust-collecting chamber, each having a vertically arranged opening communicating with the clean air chamber, means for causing dust-laden air to flow into the dust-collecting chamber and through the screens to the clean air chamber, whereby dust is deposited on the exterior of the screens, means for effecting a reverse flow of air through the screens individually for removing the dust therefrom including a horizontally movable blower within the clean air chamber, and means for moving the blower back and forth across the openings to the screens.

11. A dust arrester of the kind described comprising in combination a housing having a dust-collecting chamber and a clean air chamber, a dust wall separating the said chambers and having a plurality of vertical openings therethrough, a dust-arresting screen at each of the openings through the dust wall, each screen including a rigid rectangular frame secured to the dust wall and a flexible dust-arresting screen supported by the frame and opening into the clean air chamber through the opening in the dust wall, means for causing dust-laden air to flow from the dust-collecting chamber through the screens to the clean air chamber, whereby dust is deposited on the exterior of the screens, means for effecting a reverse flow of air through the screens individually for removing the dust therefrom, and means for moving said last mentioned means back and forth across the openings to the several screens.

12. For a dust arrester of the kind described, a dust-arresting screen comprising in combination a rigid rectangular frame element including a U-shaped tubular element and spaced strips uniting the free ends of the U-shaped element and spacers extending longitudinally of the frame element, and a flexible, dust arresting screen about the frame and supported thereby, the screen being open at the free ends of the U-shaped element.

13. A dust arrester of the kind described comprising in combination a housing having a dust-collecting chamber and a clean air chamber, a plurality of spaced, flexible, parallelly arranged, dust arresting screens within the dust-collecting chamber and open to the clean air chamber, the dust-collecting chamber having an inlet thereto arranged to effect a downward flow of air between the screens, a blower for drawing air through the screens to the clean air chamber, a dust-receiving chamber below the screens and open to the dust-collecting chamber, a second blower within the clean air chamber for effecting a reverse flow of air from the clean air chamber through the screens consecutively, and means for preventing the normal flow of air through screens adjacent the one to which said second mentioned blower is connected, whereby dust removed from the screen through which the reverse flow of air is passing falls to the dust-receiving chamber.

JAMES PAUL DONOHUE.

REFERENCES CITED

The following references are of record in the file of this patent:

UNITED STATES PATENTS

| Number | Name | Date |
| --- | --- | --- |
| 1,830,097 | Dollinger | Nov. 3, 1931 |
| 2,020,120 | Leathers | Nov. 5, 1935 |
| 2,369,649 | Abrams | Feb. 20, 1945 |
| 2,391,534 | Yerrick et al. | Dec. 25, 1945 |